Patented Oct. 17, 1950

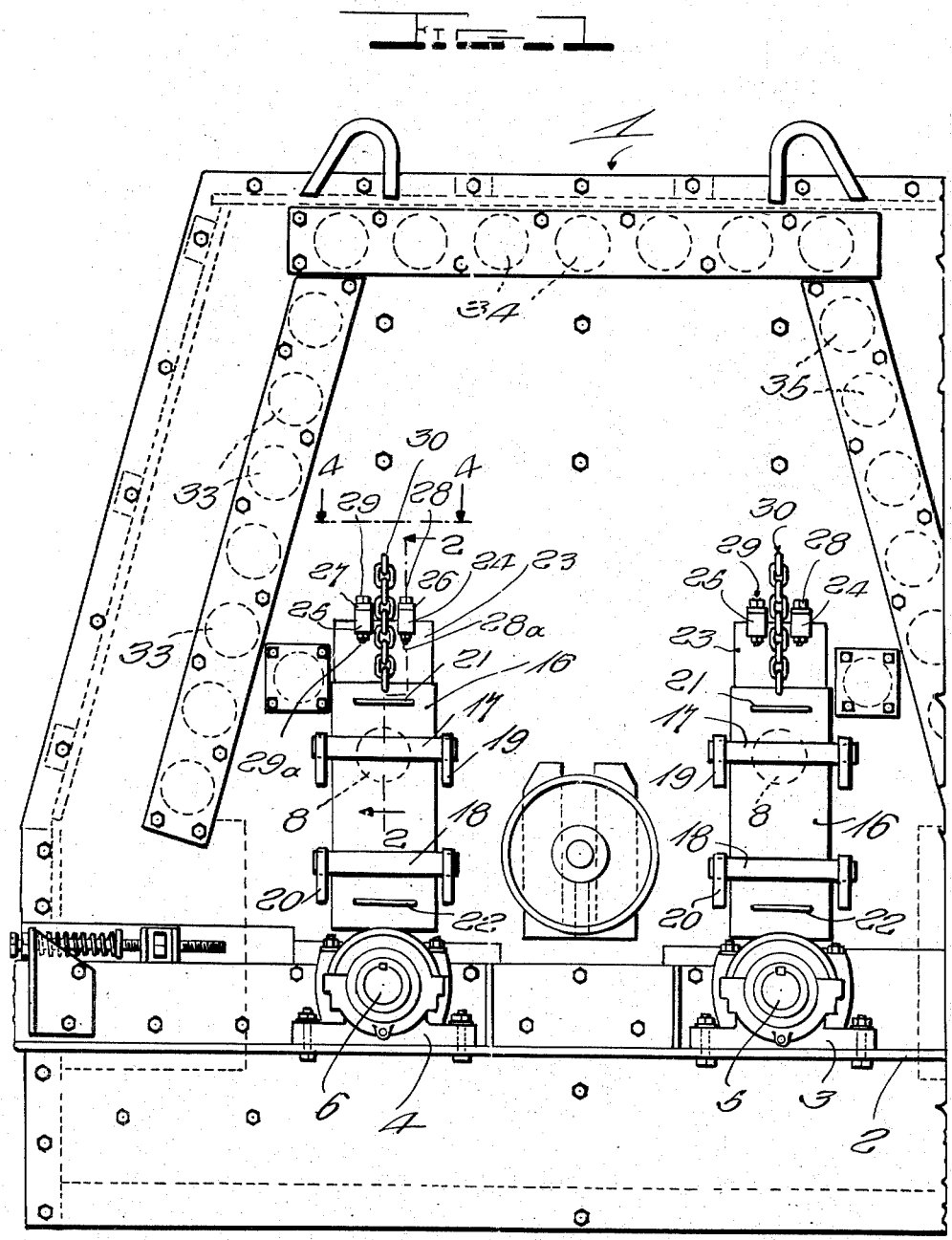

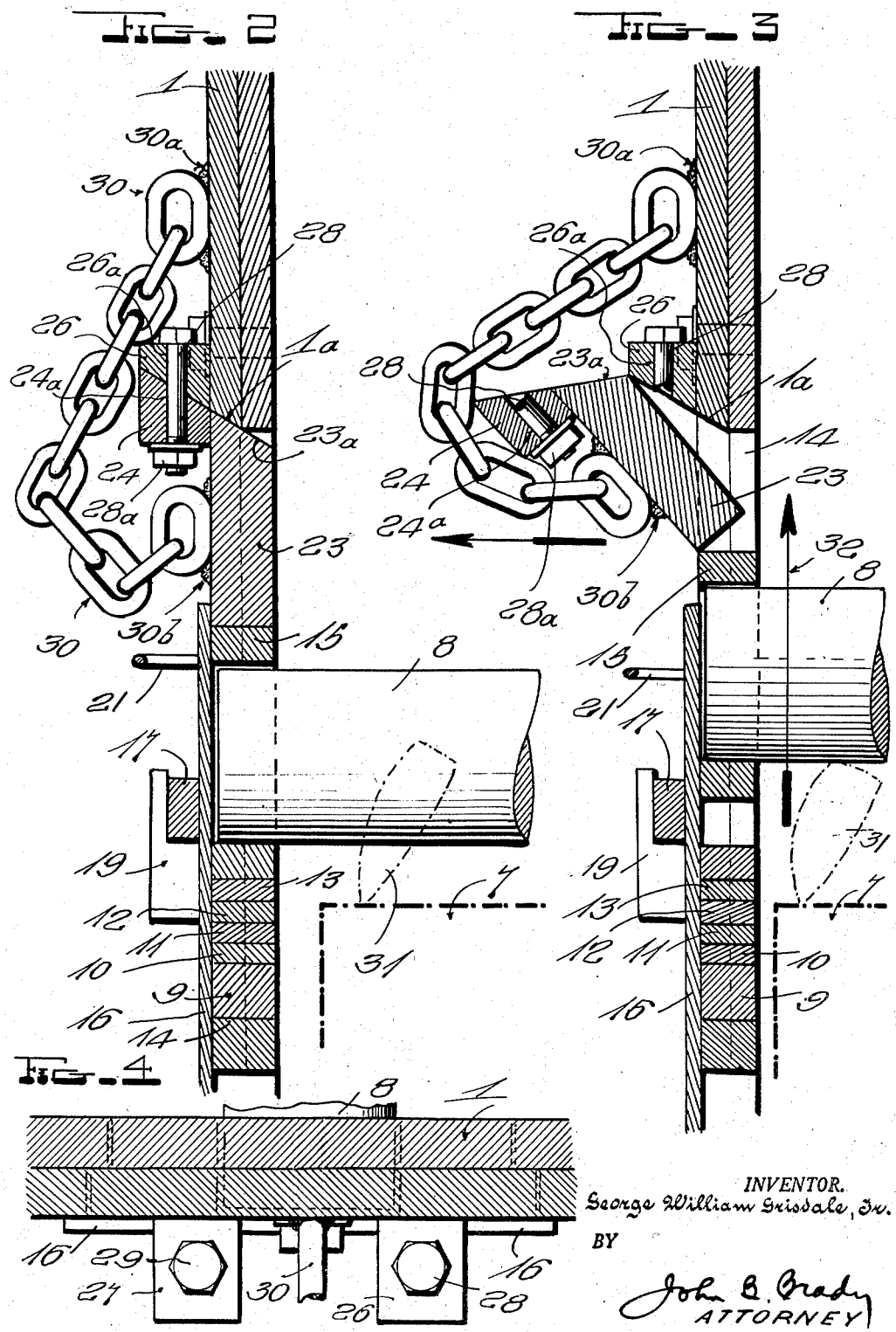

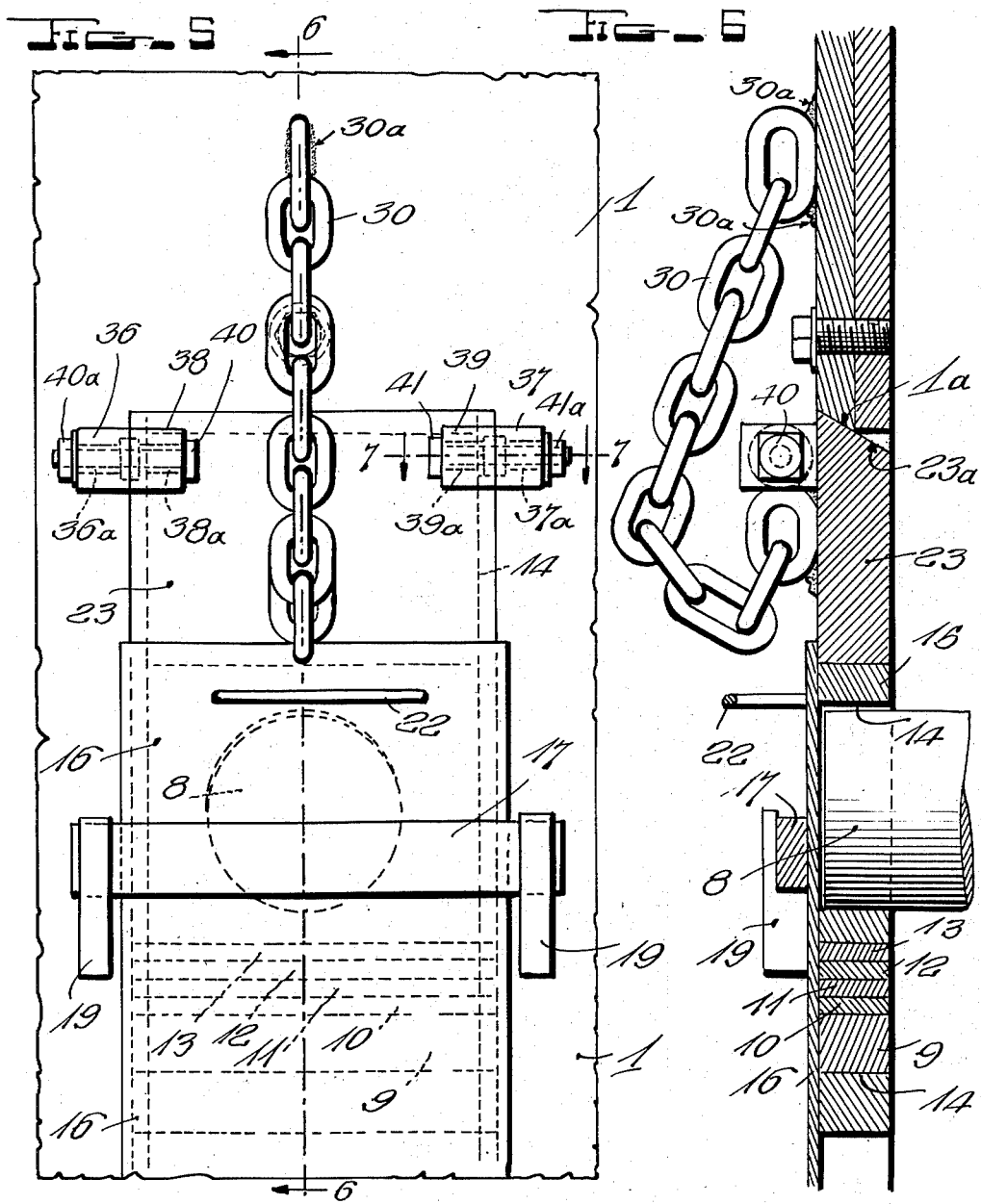

2,525,795

UNITED STATES PATENT OFFICE 2,525,795

PROTECTIVE MOUNTING FOR COACTING STATIONARY AND ROTATING MEMBERS

George W. Grisdale, Jr., Ephrata, Pa., assignor, by mesne assignments, to The Sperry Corporation, New York, N. Y., a corporation of Delaware Application March 6, 1947, Serial No. 732,849

8 Claims. (Cl. 241—32)

My invention relates broadly to rotating machinery and more particularly to means for protecting the rotating and stationary parts of machinery from damage when an unbreakable object is caught between the parts.

One of the objects of my invention is to provide a compact construction of plate support for mounting stationary parts of a machine in operative relation to coacting rotating parts in such manner that under conditions of excessive pressure which may accompany the accidental catching of an unbreakable object between the rotating and stationary parts of the mechanism, yieldable displacement of the normally stationary parts may be effected without injury to the machinery by a shearing action of the plate support.

Another object of my invention is to provide a construction of plate support for protecting rotating and stationary parts of a machine from damage when an unbreakable object is caught between them by supporting the stationary parts by coacting members in coplanar relation and subject to shear under conditions of excessive pressure between the rotating and stationary parts whereby the coacting members are displaced outwardly for enabling the stationary parts to move out of the path of the rotating parts without injury which might otherwise result.

Still another object of my invention is to provide an arrangement of yieldable abutment means for coacting rotating and stationary parts of a machine in which the abutment means may be displaced outwardly under conditions of excessive pressure against the normally stationary parts of the machine for allowing the rotating parts to continue to move without breakage until repairs and replacements can be effected.

A still further object of my invention is to provide a construction of safety device comprising a supporting plate with an angularly inclined edge adapted to coact with a complementary shaped edge of a recessed housing and mounted for lateral displacement for protecting expensive machinery containing rotating and stationary parts against damage due to obstructions whereby under conditions of excessive pressures the stationary parts may be displaced out of the path of the rotating parts to permit free and unrestricted movement of the rotating parts without damage pending repair of the equipment.

Other and further objects of my invention reside in the arrangement of protective means for rotating machinery as set forth more fully in the specification hereinafter following by reference to the accompanying drawings in which:

Figure 1 is an end elevational view of a rotating machine including rotating and stationary parts equipped with the protective mechanism of my invention; Fig. 2 is a fragmentary vertical sectional view taken substantially on line 2—2 of Fig. 1 and illustrating the normal operating position of the rotating and stationary parts of the machine to be protected and one arrangement of shearable abutment employed for protecting the mechanism against damage when an unbreakable object is caught between the rotating and stationary parts; Fig. 3 is a cross-sectional view similar to the view illustrated in Fig. 2, but showing the protective mechanism after a release condition in which the parts of the protective mechanism have been subjected to shear permitting displacement of the stationary parts with respect to the rotating parts when an unbreakable object is caught between the parts; Fig. 4 is a fragmentary horizontal sectional view taken on line 4—4 of Fig. 1 and illustrating parts of the shearable protective mechanism in top plan view; Fig. 5 is a front elevational view of a modified form of shearable protective mechanism for permitting displacement of the stationary parts with respect to the rotating parts of a machine under conditions where an unbreakable object may be caught between the parts; Fig. 6 is a vertical sectional view taken substantially on line 6—6 of Fig. 5; and Fig. 7 is a fragmentary horizontal sectional view taken substantially on line 7—7 of Fig. 5.

My invention is directed to the protection of rotating machinery generally where it is necessary in the interests of economy, maintenance and continuous operation of the rotating machinery to protect rotating and stationary parts from damage when an unbreakable object is accidentally caught between the parts. This is achieved by providing various forms of mounting means for the stationary parts which permit the stationary parts to be displaced out of normal position under conditions of excessive force developed by the accidental catching of an unbreakable object between rotating and stationary parts whereby the space between the rotating and stationary parts may be greatly enlarged enabling the unbreakable object to be released and allowing the continued movement of the rotating part without obstruction or injury. My invention may be embodied in various forms and for purposes of illustration I have shown the stationary parts of a rotating machine mounted on shearable supports arranged either in vertical or horizontal planes and which may be displaced under conditions of excessive pressure to relieve the rotatig or stationary parts from damaging obstructions. The protective structure of my invention saves long shutdowns of essential rotating equipment which when injured by accidental catching of unbreakable objects between the rotating and stationary parts require extended time and labor for replacement of damaged parts. Moreover, the protective mechanism of my invention saves very expensive equipment and parts thereof against injury and reduces maintenance costs.

In illustrating my invention herein I have shown the protective mechanism of my invention applied to stone crushing and breaking machinery, but it will be understood that my invention is not restricted or limited to stone crushing or breaking machinery, but is applicable generally to any type of machinery containing rotating and stationary parts which are to be protected from damage when an unbreakable object is caught between the parts.

Referring to the drawings in detail reference character 1 designated the housing of a stone crusher or breaking machine including a structural steel supporting frame 2 which provides mounting means for the roller bearings 3 and 4 which serve as journals for the rotors of the machine carried by rotary shafts 5 and 6. The rotors carried on shafts 5 and 6 operate within the housing 1 and have been designated as including revolving breaker bars indicated in the several views by reference character 7. Stationary breaker or impact bars 8 are arranged in coacting relation to the revolving breaker bars 7 and are mounted in very special manner with respect thereto as illustrated more particularly in Figs. 2, 3, 5, 6, 8 and 9 by means of insertable spacer blocks illustrated at 9, 10, 11, 12 and 13 which are mounted in the recess 14 in each end wall of the crusher for adjustably fixing the position of the stationary bar guide plate 15. The stationary bar guide plate 15 is selectively fixed in its spacial relation to the path of movement of revolving breaker bar 7 to position the stationary or impact bar 8 in the desired breaking and crushing relation to the revolving breaker bar 7.

The recess 14 and the spacer blocks 9—13 and the stationary bar guide plate 15 are retained in position by cover plate 16 across which there extends the locking bars 17 and 18 which are removably engageable in the latch brackets 19 and 20 secured to the end walls of the housing 1 of the crusher. The cover plate 16 is placed in position over the recess 14 when all of the several parts have been assembled within the recess 14 by manually gripping handholds 21 and 22 and pressing the cover plate 16 inwardly toward housing 1 until locking bars 17 and 18 are forced into latch brackets 19 and 20.

Within the recess 14 and above the stationary bar guide plate 15 I provide the safety release plate 23. The safety release plate 23 fits into the recess 14 and is provided with an angularly inclined top edge portion represented at 23a adapted to normally register with a correspondingly angularly inclined face 1a on housing 1. The safety release plate 23 is provided with a pair of spaced shear blocks 24 and 25 welded to the safety release plate 23. The shear blocks 24 have vertically extending bores 24a therein which register with correspondingly arranged bores in shear blocks 26 and 27 which are welded to the housing 1 immediately above recess 14 and in alignment with the shear blocks 24 and 25 carried by safety release plate 23. Vertically extending bores in shear blocks 26 and 27 align with vertically extending bores in shear blocks 24 and 25 as represented by bore 26a in shear block 26 which is aligned with bore 24a in shear block 24. Shearable retaining bolts 28 and 29 extend through the aligned bores in shear blocks 26—24 and 27—25 respectively and are normally secured therein by nuts 28a and 29a.

The safety release plate 23 is confined in relation to housing 1 within recess 14 and is retained with respect to housing 1 by means of link chain 30 welded at one end to housing 1 as represented at 30a and welded at the other end to safety release plate 23 as represented at 30b. Chain 30 prevents safety release plate 23 from falling when it is thrown out due to displacement of the stationary or impact bar 8. As represented in Fig. 2 revolving breaker bar 7 operates in normal coacting relation to stationary or impact bar 8. Fig. 2 indicates a condition where an unbreakable object 31 is approaching a position between revolving breaker bar 7 and stationary or impact bar 8. Under conditions where the revolving breaker bar 7 is moving at a relatively high rate of speed on a rotating impeller considerable damage may result to very expensive machinery by the sudden lodgment of the unbreakable object 31 between the revolving breaker bar 7 and stationary or impact bar 8. When it is considered what damage may result from such sudden wedging action, it should be realized that the machinery described herein often has a worth of within a range of twelve or fifteen thousand dollars. Such a wedging operation by an unbreakable object might result in the shearing or bending of the breaker bars or the rotor shaft or both necessitating shutdown of the machinery and the making of time-consuming and expensive replacements and repairs. However, as illustrated in Fig. 3 the operation pursuant to my invention is one in which unbreakable object 31 has the effect of displacing the stationary or impact bar 8 in the direction of arrow 32 away from revolving breaker bar 7 forcing safety release plate 23 upwardly and moving face 23a thereof in slidable relation to face 1a of housing 1 and shearing bolts 28 and 29 completely relieving the abnormal pressure and preventing injury to the breaker bars or the rotating bars of the impeller. The machine may now be shut down and rapid repairs made to restore the stationary or impact bar 8 to the required spacial relation to the revolving breaker bar 7, restoring new shear bolts 28 and 29 and restoring the machine for immediate normal operation.

The associated impact bars 33, 34 and 35 have been shown disposed within the housing 1 of the crusher in operative relation to the impact bars 8 and revolving breaker bar 7 of the impellers carried by shafts 5 and 6.

In lieu of the vertically arranged shear blocks 24—26 and 25—27 heretofore explained, I may employ a construction as illustrated in Figs. 5 and 6 wherein the shear blocks are arranged on a horizontal axis. In this arrangement the shear blocks 36 and 37 are mounted on housing 1 on opposite sides of recess 14 therein. Shear blocks 38 and 39 are welded on opposite sides of the safety release block 23 in alignment with the shear blocks 36 and 37. Aligned bores through the shear blocks are each provided with hardened steel bushings which I have represented at 36a, 38a, 39a, and 37a through which shear bolts 40 and 41 extend in a horizontal direction. Shear bolts 40 and 41 are normally maintained in position through the shear blocks by means of nuts 40a and 41a whereby the safety release plate 23 is maintained in normal position. Under conditions of excessive force exerted against stationary or impact bar 8 safety release plate 23 is displaced in a direction whereby inclined face 23a rides against inclined face 1a of housing 1 effecting a shearing of bolts 40 and 41 and so widening the gap between revolving crusher bar 7 and stationary or impact bar 8 as to prevent injury to any of the parts of the mechanism.

For purposes of explaining my invention I have referred to but one side of the housing and to but one of the impellers therein. It will be understood that the structure shown herein is symmetrically applied to both sides of the housing and to both impellers operated within the housing. Similiar reference characters have been applied to both of the shear mounting means illustrated in Fig. 1 and in referring thereto it will be understood that similar reference characters apply to the mounting means on the opposite side of the housing as symmetry and uniformity is carried through the entire structure of my invention.

I have found the protective arrangements of my invention highly practical and suucessful in operation and while I have described my invention in certain preferred embodiments I realize that modifications may be made and I desire that it be understood that no limitations upon my invention are intended other than may be imposed by the scope of the appended claims.

What I claim as new and desire to secure by Letters Patent of the United States is as follows:

1. Rotating machinery comprising a supporting housing, a rotating member journalled with respect to said housing, said housing being recessed adjacent said rotating member, a bar guide plate mounted in the recessed housing, a stationary member carried by said bar guide plate, a set of spaced shear blocks carried by said housing, a safety release plate mounted in the recessed housing in coplanar relation to said bar guide plate, a set of coacting spaced shear blocks mounted on said safety release plate and alignable with said set of shear blocks, a shear pin interconnecting said shear blocks and frangible under conditions of excessive pressure established between said rotating and stationary members for permitting displacement of said safety release plate with respect to said housing and a cover plate extending over said bar guide plate and over a portion of said safety release plate and fastened to said housing.

2. Rotating machinery comprising a supporting housing, a rotating member journalled with respect to said housing, said housing being recessed adjacent said rotating member, a bar guide plate mounted in the recessed housing, a stationary member carried by said bar guide plate, a safety release plate mounted in the recessed housing in coplanar relation to said bar guide plate, a set of spaced shear blocks mounted on said housing adjacent the top of the safety release plate mounted in the recessed housing, a set of coacting spaced shear blocks mounted at the top of said safety release plate in alignment with the set of shear blocks on said housing and shear pins coupling said coacting shear blocks, said shear pins being frangible under conditions of excessive pressure established between said rotating and stationary members for permitting displacement of said bar guide plate with respect to said housing.

3. Rotating machinery comprising a supporting housing, a rotating member journalled with respect to said housing, said housing being recessed adjacent said rotating member, a bar guide plate mounted in the recessed housing, a stationary member carried by said bar guide plate, a set of spaced shear blocks carried by said housing on opposite sides of said bar guide plate, a set of coacting spaced shear blocks mounted adjacent opposite edges of said safety release plate in alignment with the spaced shear blocks on said housing and shear pins interconnecting said shear blocks and frangible under conditions of excessive pressure established between said rotating and stationary members for permittting displacement of said bar guide plate with respect to said housing.

4. Rotating machinery comprising a supporting housing, a rotating member journalled with respect to said housing, said housing being recessed adjacent said rotating member, a bar guide plate mounted in the recessed housing, a stationary member carried by said bar guide plate, a safety release plate mounted in the recessed housing in coplanar relation to said bar guide plate, a set of shear blocks supported by said housing adjacent the safety release plate mounted in the recessed housing, a set of coacting shear blocks carried by said bar guide plate and aligned with the shear blocks on said housing, shearable coupling members interconnecting said shear blocks and a flexible supporting member interconnecting said safety release plate with said housing whereby upon severance of said shearable coupling members under conditions of excessive pressure established between said stationary member and said rotating member, and displacement of said safety release plate, said safety release plate is gravitationally suspended with respect to said housing through said flexible supporting member.

5. Rotating machinery comprising a supporting housing, a rotating member journalled with respect to said housing, said housing being recessed adjacent said rotating member, a bar guide plate mounted in the recessed housing, a stationary member carried by said bar guide plate, a safety release plate mounted in the recessed housing in coplanar relation to said bar guide plate, a set of shear blocks supported by said housing adjacent the safety release plate mounted in the recessed housing, a set of coacting shear blocks carried by said safety release plate and aligned with the shear blocks on said housing, shearable coupling members interconnecting said shear blocks and a flexible linked chain interconnecting said safety release plate with said housing whereby upon severance of said shearable coupling members under conditions of excessive pressure established between said stationary member and said rotating member, and displacement of said safety release plate, said safety release plate is gravitationally suspended with respect to said housing through said flexible linked chain.

6. Safety mechanism as set forth in claim 5 in which the flexible linked chain is positioned in a vertical path intermediate the sets of shear blocks on said housing and the coacting shear blocks on said safety release plate.

7. Rotating machinery comprising a supporting housing, a rotating member journalled with respect to said housing, said housing being recessed adjacent said rotating member, a bar guide plate mounted in the recessed housing, a stationary member carried by said bar guide plate, a safety release plate mounted in the recessed housing in coplanar relation to said bar guide plate, the top edge of said safety release plate being inclined upwardly and the bottom edge of the recessed housing being inclined outwardly at an angle complementary to the angle of the inclined top edge of said safety release plate, a set of spaced shear blocks mounted on said housing adjacent the top of the safety release plate mounted in the recessed housing, a set of coacting spaced shear blocks mounted at the top of said safety release plate in alignment with the set of shear blocks on said housing and shear pins coupling said coacting shear blocks, said shear pins being frangible under conditions of excessive pressure established between said rotating and stationary members whereby the inclined top edge of said safety release plate slides outwardly and upwardly on the outwardly inclined edge of the recessed housing permitting displacement of said bar guide plate with respect to said housing.

8. Rotating machinery comprising a supporting housing, a rotating member journalled with respect to said housing, said housing being recessed adjacent said rotating member, a bar guide plate mounted in the recessed housing, a stationary member carried by said bar guide plate, a safety release plate mounted in the recessed housing in coplanar relation to said bar guide plate, the top edge of said safety release plate being inclined upwardly and the bottom edge of the recessed housing being inclined outwardly at an angle complementary to the angle of the inclined top edge of said safety release plate, spaced shear blocks on said housing and coacting shear blocks on said safety release plate with frangible shear pins extending therebetween whereby under conditions of excessive pressure between said stationary and rotatable members said shear pins are severed and said safety release plate is displaced outwardly with the inclined upper edge thereof riding on the outwardly inclined bottom edge of the recessed housing for permitting separation of said stationary and rotatable members.

GEORGE W. GRISDALE, Jr.

REFERENCES CITED

The following references are of record in the file of this patent:

UNITED STATES PATENTS

| Number | Name | Date |
|---|---|---|
| 174,719 | Clark | Mar. 14, 1876 |
| 480,660 | Farquhar et al. | Aug. 9, 1892 |
| 1,590,305 | McLean | June 29, 1926 |
| 1,606,035 | Mitts | Nov. 9, 1926 |
| 1,735,823 | Huffman | Nov. 12, 1929 |
| 1,770,382 | Armstrong | July 15, 1930 |
| 1,772,321 | Ossing | Aug. 5, 1930 |
| 1,780,112 | Bowman | Oct. 28, 1930 |